A. FINK.
Bridge.
No. 9,575. Reissued Feb. 15, 1881.
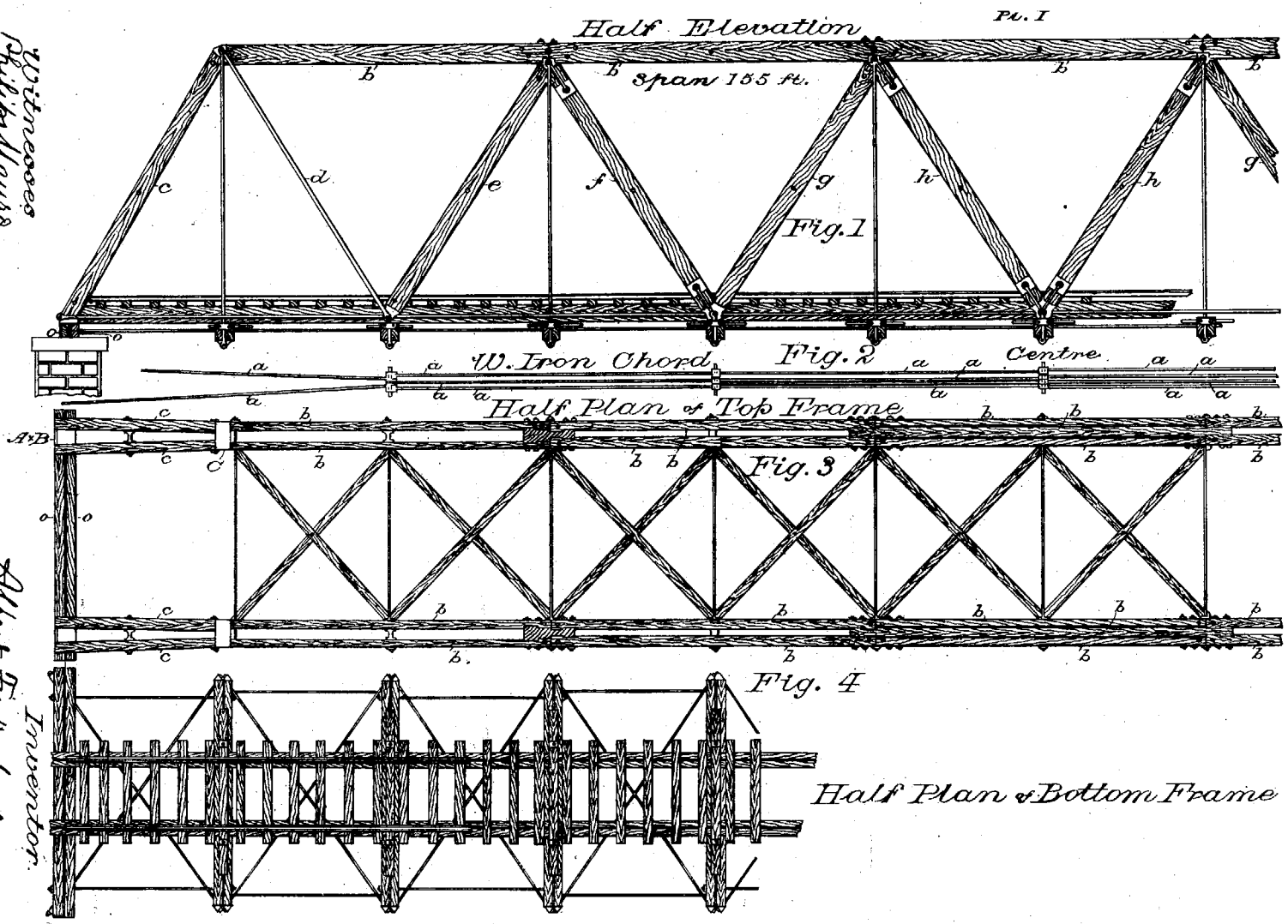
Witnesses
Philip Maurer
F. S. Eastman
Inventor.
Albert Fink by
A. Pollok attorney.
N. PETERS, PHOTO-LITHOGRAPHER, WASHINGTON, D.C.

3 Sheets—Sheet 2.
A. FINK.
Bridge.
No. 9,575. Reissued Feb. 15, 1881.
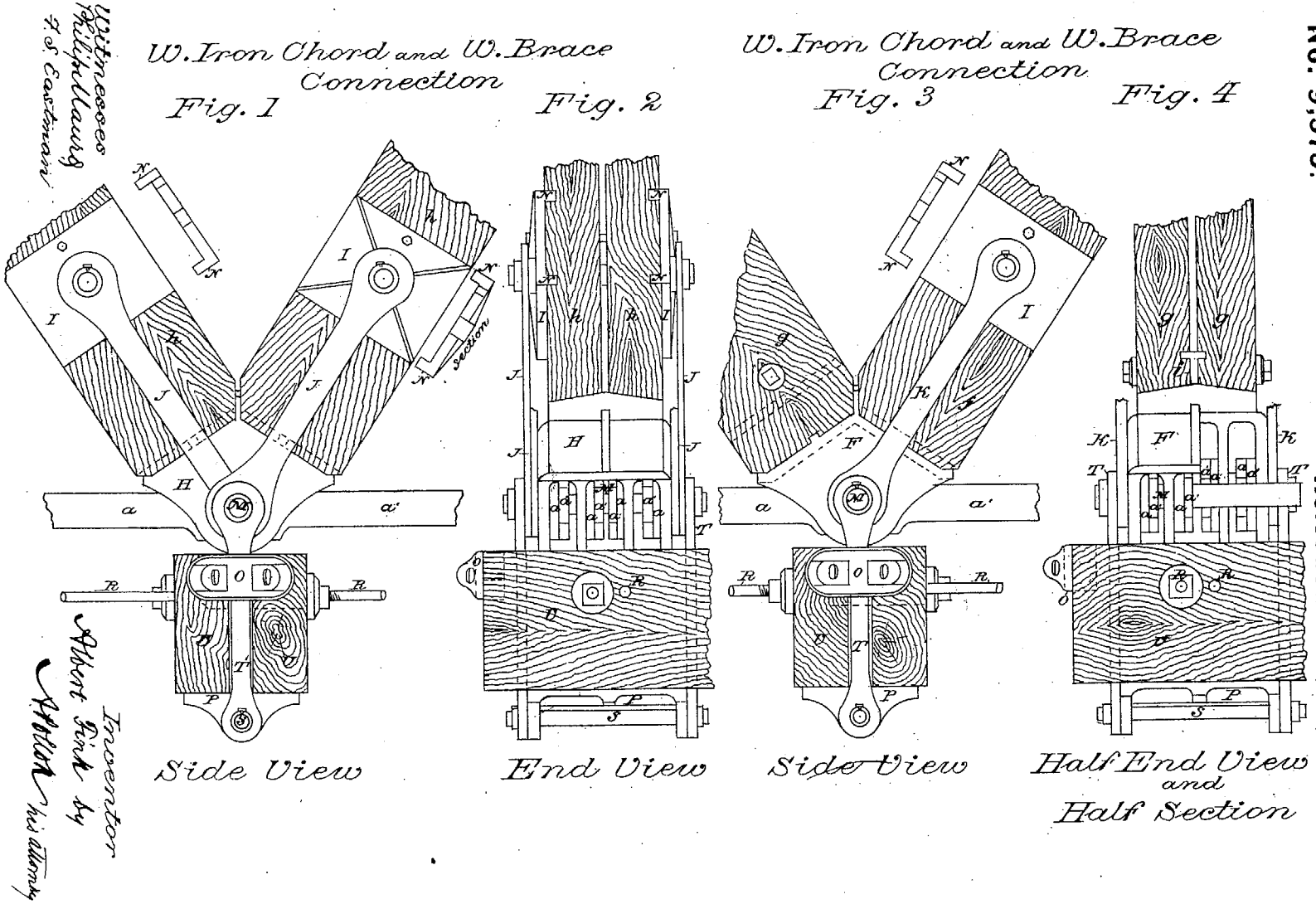
Witnesses
Philip Mauro
F. S. Eastman
Inventor
Albert Fink by
A Bolton his attorney
N. PETERS, PHOTO-LITHOGRAPHER, WASHINGTON, D. C.

A. FINK.
Bridge.
No. 9,575. Reissued Feb. 15, 1881.
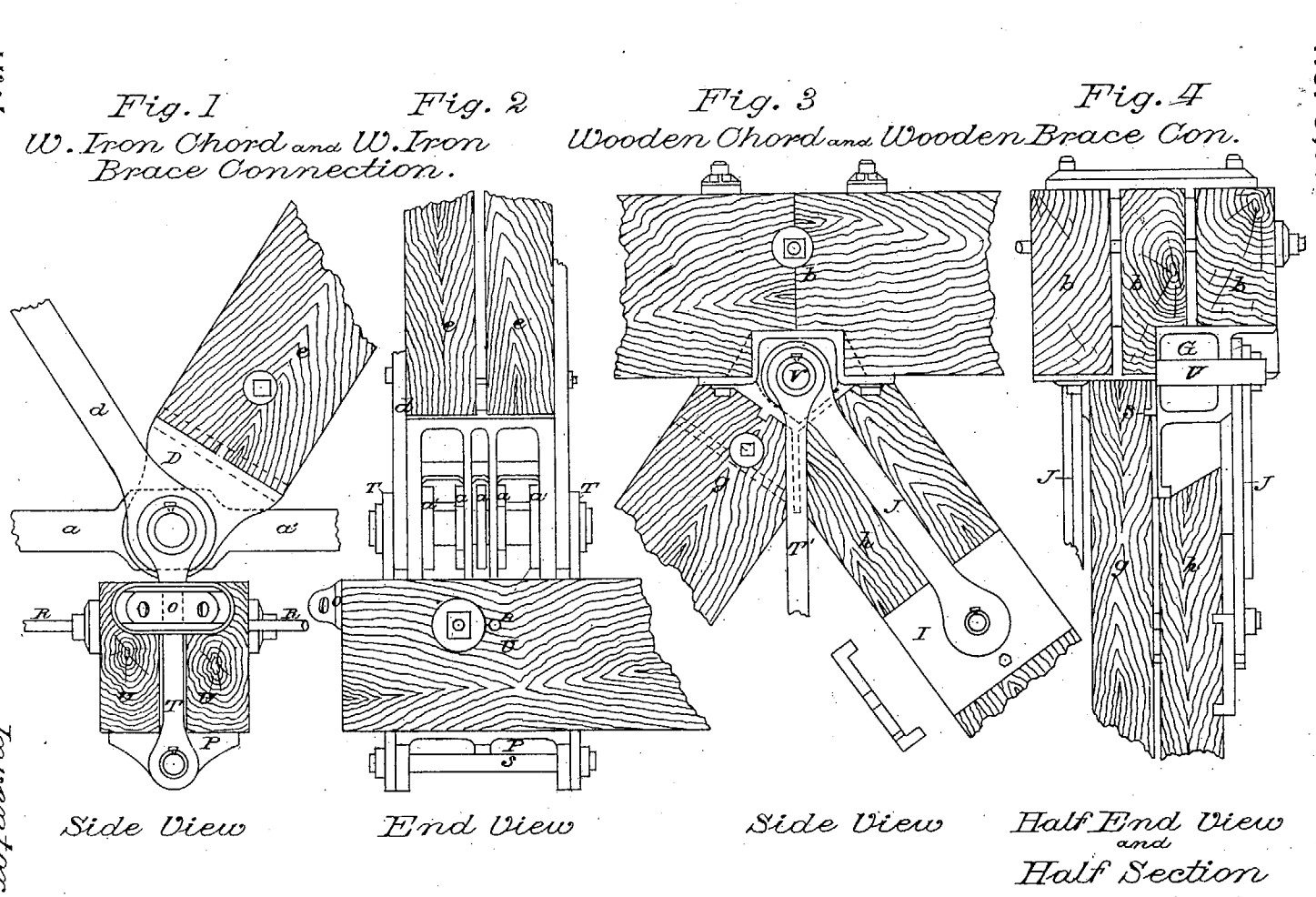
Witnesses
Philip Allaur
F. S. Eastman
Inventor
Albert Fink by
A. Pollok his atty.
N. PETERS, PHOTO-LITHOGRAPHER, WASHINGTON, D. C.

UNITED STATES PATENT OFFICE.

ALBERT FINK, OF NEW YORK, N. Y.

BRIDGE.

SPECIFICATION forming part of Reissued Letters Patent No. 9,575, dated February 15, 1881.

Original No. 63,714, dated April 9, 1867; Reissue No. 4,093, dated August 9, 1870. Application for reissue filed May 20, 1880.

*To all whom it may concern:*

Be it known that I, ALBERT FINK, of the city of New York, in the county and State of New York, have invented a new and useful Improvement in Bridge-Trusses, of which the following is a full, clear, and exact description.

It is well-known that the lower chords of wooden bridges are the parts of these structures first to give way, a comparatively small amount of decay, requiring from six to eight years of time in uncovered structures, being sufficient to cause the failure of the lower chords of wooden bridges. If covered so as to be protected from the effect of the weather, the structure is in great danger of destruction by fire or high winds, the amount of surface for the action of these agents being so much increased. In order to remedy this defect in wooden bridges I substitute a wrought-iron bottom chord for the wooden one and adopt the triangular system of bracing between the two chords, both because this system best avoids evils arising from the unequal expansion of a wrought-iron bottom and a wooden top chord, and because it is the system of bracing having the least amount of material for equal strength with other systems; and, further, I so construct the braces that they may act as struts and as ties, or, in other words, so that they may resist strains of tension as well as of compression, in order that the various parts of the truss may never come out of adjustment, and the truss itself, under all conditions, whether the bottom chord be more or less expanded, may possess the same strength.

In adapting the triangular system of bracing or triangular truss to bridges having a wooden top chord difficulty is encountered in making a strong and solid connection between the braces and said top chord, and especially between the latter and those braces which have to resist alternately compression and tensile strains. This difficulty I overcome by making said connection through devices which allow the component strains communicated from a brace in tension to one in compression to be transmitted directly without passing through the wooden top chord. One or more castings, according to the length of the bridge, are placed on the under side of the said chord, are retained in position upon the top of the compression-braces, and are connected by pins with the tension bars or straps of the other braces, which are adapted to resist strains of tension as well as of compression. These castings, which are thus the medium of connection between the wooden top chord and braces, form a part of the diagonal bracing of the truss, so that the component strains communicated from one brace to the other through the pin in the casting do not pass through the wooden chord.

In using in a triangular truss wooden compression-braces there is difficulty in making a sufficiently solid and strong connection between the wooden compression-braces and those which have to withstand both tensile and compressive strains, or between these braces and the wrought-iron bottom chord. In order to overcome this difficulty I connect at the bottom the wooden compression-braces with the other braces by means of castings upheld by tension bars or straps, forming part of the last-named braces, and suitable pins. The lower ends of the wooden braces rest on said castings, and the bars constituting the iron bottom chords are also connected with the said pins.

My invention therefore may be stated to consist in the combination of a wrought-iron bottom chord with a wooden top chord in a triangular truss, when connected together by a brace or braces so constructed as to be able to resist compressive as well as tensile strains, or, in other words, by braces which can act as struts and as ties when placed in a position in which they may be required to act under a moving load at one time in the one and at another time in the other capacity; also, in making, in a triangular truss-bridge having a wooden top chord and iron bottom chord, the connections at the top between the compression-braces and the corresponding tension-braces, or braces adapted to resist alternately compressive and tensile strains independent of the wooden top chord, the component strain being communicated directly from one brace to the other, and in the particular device for making the said connections; and also in the connection, at the bottom, of the wooden compression-braces and the other braces, which are alternately subjected to compressive and tensile strains, by suitable pins and castings upheld by tension bars or straps forming part of the last-named braces. In this manner a more durable structure than the common wood bridge is obtained without greatly increasing the cost; and in order to give greater durability to the wooden portions of the bridge I cover each top chord with a roof and so arrange the timbers in both chords and braces that there may be a free circulation of air around them, and that any piece may be removed and replaced by new timber without trestling up the bridge or interrupting the passage of trains.

To enable those skilled in the art of bridge-building to understand my invention, I add the following description, reference being had to the accompanying drawings, which form a part of this specification.

Plate I: Figure 1 represents a general view of the improved bridge-truss; Fig. 2, plan of the wrought-iron bottom chord; Fig. 3, the wooden top chord, framed together with the top lateral bracing, both chords being carefully proportioned according to the strains; and Fig. 4, the bottom frame with its system of horizontal bracings.

The iron bottom chord is indicated by *a a* and the wooden top chord by *b b*. *c c* are the end braces resting in the cast-iron shoe B, which moves back and forward as the iron chord expands or contracts on plate A. The whole structure sits on the wall-plates *o o*. *d d*, Fig. 1, are wrought-iron braces, and *e e*, *f f*, *g g*, *h h*, and *c c* are wooden braces between top and bottom chords.

Plate II: Figs. 1, 2, 3, and 4 show the connection of the wooden braces with the wrought-iron bottom chord.

H is a shoe-casting, which receives the braces *h h*. The braces *h h*, Fig. 2, consist of two sticks, in order that one of the sticks may be removed, if from decay or other causes it needs replacing, while the other is holding the bridge up, thereby rendering scaffolding unnecessary.

I and I, Figs. 1 and 2, are castings, with lugs N let into the side of the braces *h h*. They are connected by the wrought-iron straps J J with the shoe-casting H. A pin, M, passes through H, and connects firmly, first, the links or bars of the iron chord *a a*, and, secondly, the braces *h h*, with each other through the means of the straps J J and shoe-casting, and, lastly, the braces and bottom chord. This connection allows the braces *h h* to act either as struts or ties, as the position of the moving load may require them to do.

From the pin M are suspended, by means of the links T and the casting P, the floor-beams U U.

O O is a casting which receives the diagonal brace-rods.

R R are the rods which keep the floor-beams spaced, and which, with the diagonal rods, form the system of horizontal bracing of the floor of the bridge.

Plate II, Figs. 3 and 4, shows the connection of braces *f g* to each other and to the wrought-iron bottom chord. Under a load distributed uniformly over the whole truss the brace *g* has to sustain a compressive strain only; but under a moving load it has also to sustain a small tensile strain. The connection with the shoe-casting F by the rib *i i* enables the brace *g* to act as a tie to the extent required. The connection of the shoe-casting F and the braces *f* and *g* and the chord *a a'* is made as before described.

Plate III: Figs. 1 and 2 show the connection of wrought-iron brace *d* with wooden brace *e* and with iron chord *a a'*, the same letters denoting the same parts in Figs. 1 and 2.

Plate III: Figs. 3 and 4 show the connection of braces *g* and *h* with upper wooden chord, *b b*, by means of casting G G, brace-strap J, and pin V. Plate I and strap J form the tensile connection of *h* to *b*, as described in case of brace *h* and iron bottom chord, *a a'*. The rib *s* enables the brace *g* to resist the small tensile strain which is thrown on it by a moving load.

The casting G, the peculiar shape of which is shown in Figs. 3 and 4, Plate III, is placed on the under side of the chord *b*, and, as shown, is bolted thereto and rests upon the top of the compression-brace *g*. To said casting, by means of a pin, V, passing through it, are attached the suspenders T' and tension bars or straps J of the other brace, *h*. The component of the tensile strains upon this brace, which are transmitted to brace *g*, pass through the pin V and casting G to the top of the compression-brace *g* without using the chord *b* as a medium through which connection is made. The casting G thus forms a part of the brace frame-work of the bridge, and not part of, but an appendage to, the chord. All the braces of the truss, through this peculiar connection, convey strains to one another without passing through the chord, and thus form in themselves a system of struts and ties or diagonal braces independent of the latter, in this respect differing from bridges of the ordinary construction, and constituting a feature of great advantage, as well for the convenience of removal of the wooden parts of the chord as for the purpose of avoiding the evil effects of the shrinkage of the wooden chord in disturbing the proper adjustment of the braces.

The brace *h*, from which the resolved tensile strains are carried through the pin V and casting G to the brace *g*, is so constructed as to be able to act at one time as a compression and at another time as a tension brace, according as the moving load over a triangular bridge-truss may require it to act. Its action as a tension-brace through the straps J, I have described. It will be readily seen that it will resist compressive strains also through the iron straps J and the wooden part of the brace.

The material part of this portion of my invention consists in conveying the tensile strain, when said brace acts as a tension-brace, through straps or tension-bars and a pin passing through a casting which is placed directly upon the compression-brace, without making the wooden top chord a medium through which the connection between the compression and tension braces is made, for the reasons already fully explained. The connection between the compression-brace *e*, Fig. 1, Plate I, and the brace *f* is made in the manner just described for braces *g h*, and no additional description is deemed necessary.

The braces, as herein shown, may be made either of wood or iron. The firm and strong connection at the bottom between the compression-braces formed of wood, as shown and particularly described, and the braces adapted to act both as struts and ties, is effected, in the manner already explained with reference to Figs. 1, 2, 3, and 4 of Plate II, by means of castings F H and pins M, to which pins the bars of the wrought-iron chord are also attached. The castings F H are upheld by the tension bars or straps K and J, which convey the strains from the compression-braces and the brace *h*, which is, for the time being, in compression, to the braces *f* and brace *h* in tension.

The material part of this portion of the invention is that the strains from a wooden compression-brace are transmitted through a casting and pin to the tension bars or straps of another brace, whether or not the wooden compression-brace is itself adapted to serve alternately as a tension as well as a compression brace.

Any one familiar with the well-established principles of bridge construction can proportion the various parts of this truss so that they may resist the strains to which they are subjected.

I have now fully described the nature and object of my improvement. I do not claim as my invention the general arrangement of the braces, as this has long been in use for iron bridges, nor do I claim the use of an iron bottom chord in connection with a wooden top chord; but What I do claim as a new and useful improvement in bridge-trusses is—

1. The combination of a wrought-iron bottom chord and wooden top chord in a triangular truss with a system of braces connected with both upper and lower chord and with each other in the manner described, so that the braces, placed in a position in the bridge-truss where, under a moving load, they may be required to act at one time as struts and at another time as ties, are capable of resisting strains as well of compression as of tension, substantially as set forth.

2. In a triangular truss, the combination, with a wooden top chord and wrought-iron bottom chord, of braces having with each other, at the top, a direct connection, through which strains are conveyed from brace to brace without passing through an intervening portion of the top chord, substantially as described.

3. The combination, in a triangular truss, with a wooden top chord and iron bottom chord, of a compression-brace and a second brace adapted to resist tension as well as compression, a casting placed on the top of said compression-brace and on the under side of said top chord and connected with the tension bars or straps of said second brace, so as to form a part of the diagonal bracing of the truss, substantially as described.

4. The combination, in a triangular truss, with a wooden compression-brace and the other brace of the truss, constructed to resist compression and tension, of a casting connected by a pin with the tension bars or straps of the last-named brace and upheld by the same, and forming a support for the lower end of said wooden compression-brace, substantially as described.

In witness whereof I have signed this specification in the presence of two subscribing witnesses.

ALBERT FINK.

Witnesses:
C. H. CROSBY,
E. M. SHERMAN.